(12) United States Patent
Xia et al.

(10) Patent No.: US 9,809,663 B2
(45) Date of Patent: Nov. 7, 2017

(54) CATALYST COMPONENT FOR OLEFIN POLYMERIZATION, PREPARATION METHOD THEREOF, AND CATALYST COMPRISING SAME

(71) Applicants: China Petroleum & Chemical Corporation, Beijing (CN); Beijing Research Institute of Chemical Industry, China Petroleum & Chemical Corporation, Beijing (CN)

(72) Inventors: Xianzhi Xia, Beijing (CN); Jin Zhao, Beijing (CN); Weili Li, Beijing (CN); Yuexiang Liu, Beijing (CN); Yongtai Ling, Beijing (CN); Ping Gao, Beijing (CN); Yang Tan, Beijing (CN); Futang Gao, Beijing (CN); Renqi Peng, Beijing (CN); Jigui Zhang, Beijing (CN)

(73) Assignees: CHINA PETROLEUM & CHEMICAL CORPORATION, Beijing (CN); BEIJING REAEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 0 days.

(21) Appl. No.: 15/029,870

(22) PCT Filed: Oct. 17, 2014

(86) PCT No.: PCT/CN2014/088808
§ 371 (c)(1),
(2) Date: Apr. 15, 2016

(87) PCT Pub. No.: WO2015/055137
PCT Pub. Date: Apr. 23, 2015

(65) Prior Publication Data
US 2016/0264694 A1    Sep. 15, 2016

(30) Foreign Application Priority Data
Oct. 18, 2013   (CN) .......................... 2013 1 0491626

(51) Int. Cl.
*C08F 110/06*  (2006.01)
*C08F 10/06*  (2006.01)

(52) U.S. Cl.
CPC ............ *C08F 110/06* (2013.01); *C08F 10/06* (2013.01)

(58) Field of Classification Search
None
See application file for complete search history.

(56) References Cited

U.S. PATENT DOCUMENTS 6,323,152 B1   11/2001   Sacchetti et al.
7,351,778 B2 *   4/2008   Gao .................. C08F 10/00
                                             502/103

(Continued)

FOREIGN PATENT DOCUMENTS

CN        1091748 A  *   9/1994
CN     101544710 A        9/2010

(Continued)

OTHER PUBLICATIONS

International Search Report for PCT/CN2014/088808 dated Jan. 16, 2015.

(Continued)

*Primary Examiner* — Catherine S Branch
(74) *Attorney, Agent, or Firm* — Duane Morris LLP

(57) ABSTRACT

The present invention provides a catalyst component for olefin polymerization and a preparation method thereof, and a catalyst for olefin polymerization and an application thereof. The catalyst component for olefin polymerization comprises reaction products of the following components: (1) a solid component; (2) at least one titanium compound; and (3) at least two internal electron donors, wherein the solid component comprises a magnesium compound repre- (Continued)

sented by formula (1) and an epoxide represented by formula (2), wherein $R_1$ is a $C_1$-$C_{12}$ linear or branched alkyl; $R_2$ and $R_3$ are identical or different, and are independently hydrogen or unsubstituted or halogen-substituted $C_1$-$C_5$ linear or branched alkyl; X is halogen; m is in a range of from 0.1 to 1.9, n is in a range of from 0.1 to 1.9, and m+n=2.

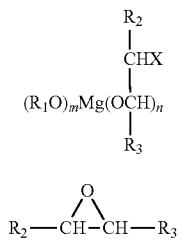

(1)

$$R_2 - \overset{O}{\overset{/\backslash}{CH - CH}} - R_3$$

(2)

21 Claims, 3 Drawing Sheets

(56) References Cited

U.S. PATENT DOCUMENTS

| | | |
|---|---|---|
| 2012/0252992 A1 | 10/2012 | Li et al. |
| 2012/0264590 A1 | 10/2012 | Li et al. |

FOREIGN PATENT DOCUMENTS

| | | |
|---|---|---|
| CN | 102040680 A1 | 5/2011 |
| CN | 102040681 A1 | 5/2011 |
| CN | 102137876 A | 7/2011 |
| CN | 102453128 A | 5/2012 |
| CN | 102137876 B | 12/2012 |
| CN | 102453128 B | 7/2013 |
| CN | 102124036 B | 8/2013 |
| EP | 1083187 A1 | 3/2001 |
| EP | 1609805 A1 | 12/2005 |
| EP | 2489684 A1 | 8/2012 |
| EP | 2489685 A1 | 8/2012 |
| JP | 2013507491 A | 3/2013 |
| JP | 2013507492 A | 3/2013 |
| KR | 20120089324 A | 8/2004 |
| KR | 20120091220 A | 8/2011 |
| WO | 03068828 A1 | 8/2003 |
| WO | WO03082930 A2 | 10/2003 |
| WO | WO2011044760 A1 | 4/2011 |
| WO | WO2011044761 A1 | 4/2011 |

OTHER PUBLICATIONS

EP 2489684 A4 (Supplementary European Search Report for EP Application No. 10 82 2993, dated Sep. 30, 2013).
EP 2489685 A4 (Supplementary European Search Report for EP Application No. 10 82 2992, dated Dec. 17, 2013).
Extended European Search Report for Application No. 14854754.0, dated Apr. 26, 2017.

* cited by examiner

CATALYST COMPONENT FOR OLEFIN POLYMERIZATION, PREPARATION METHOD THEREOF, AND CATALYST COMPRISING SAME

CROSS REFERENCE OF RELATED APPLICATIONS

The present application claims the benefit of the Chinese Patent Application No. 201310491626.2, filed on Oct. 18, 2013, which is incorporated herein by reference in its entirety and for all purposes.

FIELD OF THE INVENTION

The present invention relates to a catalyst component for olefin polymerization, a method for preparing a catalyst component, a catalyst component for olefin polymerization prepared by the method, a catalyst for olefin polymerization comprising the catalyst component, and use of the catalyst for olefin polymerization in olefin polymerization.

BACKGROUND ART

Most of catalysts for olefin polymerization are prepared by supporting a titanium halide on an active magnesium chloride. A common method used to prepare the active magnesium chlorides is to react anhydrous $MgCl_2$ with an alcohol to form a magnesium chloride-alcohol adduct of general formula: $MgCl_2 \cdot mROH \cdot nH_2O$. Then, a titanium halide is supported on such an adduct to afford a solid catalyst component for olefin polymerization. Such alcohol adducts may be prepared by known processes, such as spray drying process, spray cooling process, high-pressure extruding process, or high-speed stirring process. See, for example, U.S. Pat. No. 4,421,674, U.S. Pat. No. 4,469,648, WO8707620, WO9311166, U.S. Pat. No. 5,100,849, U.S. Pat. No. 6,020,279, U.S. Pat. No. 4,399,054, EP0395383, U.S. Pat. No. 6,127,304 and U.S. Pat. No. 6,323,152.

Other magnesium-containing complex carriers useful in the preparation of catalysts for olefin polymerization are also known in the art. For example, CN102040681A discloses a compound that can be used as a carrier of catalysts for olefin polymerization, having a structure of:

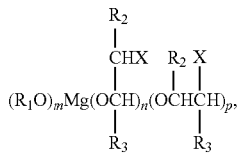

wherein $R_1$ is a $C_1$-$C_{12}$ linear or branched alkyl; $R_2$ and $R_3$ are identical or different, and are independently hydrogen or unsubstituted or halogen-substituted $C_1$-$C_5$ linear or branched alkyl; X's are chlorine or bromine, and one of the X's may be $C_1$-$C_{14}$ alkyl, $C_1$-$C_{14}$ alkoxy, $C_6$-$C_{14}$ aryl or $C_6$-$C_{14}$ aroxy; m is in a range of from 0.1 to 1.9, n is in a range of from 0.1 to 1.9, and p+m+n=2. Said compound is prepared as follows: $MgX_2$ reacts with an alcohol of general formula $R_fOH$ in the presence of an inert dispersion medium at 30 to 160° C., to form a magnesium halide-alcohol adduct solution; then the solution reacts with an oxirane compound at 30 to 160° C., to form the magnesium compound useful as a carrier, wherein X is chlorine or bromine, $R_1$ is a $C_1$-$C_{12}$ linear or branched alkyl. CN102040680A also discloses an olefin polymerization catalyst, which is prepared by using said compound useful as a carrier of olefin polymerization catalyst disclosed in the above-mentioned patent application.

There is still need a catalyst component for olefin polymerization that exhibits desired properties, such as high activity and high stereo-directing ability, and a method by which such a catalyst component can be simply, effectively, and low-costly prepared.

SUMMARY OF THE INVENTION

An object of the invention is to provide a novel catalyst component for olefin polymerization.

A further object of the invention is to provide a method for preparing the catalyst component for olefin polymerization.

A still further object of the invention is to provide a catalyst for olefin polymerization comprising the catalyst component.

A still further object of the invention is to provide use of the catalyst in olefin polymerization.

In some embodiments, the present invention provides a catalyst component for olefin polymerization, comprising reaction products of the following components:

(1) a solid component;
(2) at least one titanium compound; and
(3) at least two internal electron donors;

wherein the solid component comprises a magnesium compound represented by formula (1) and an epoxide represented by formula (2),

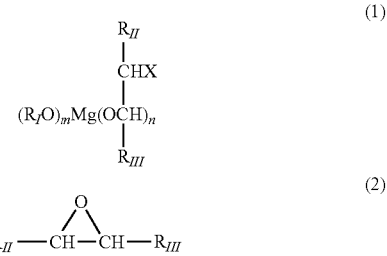

wherein, $R_f$ is a $C_1$-$C_{12}$ linear or branched alkyl; $R_{II}$ and $R_{III}$ are identical or different, and are independently hydrogen or unsubstituted or halogen-substituted $C_1$-$C_5$ linear or branched alkyl; X is halogen; m is in a range of from 0.1 to 1.9, n is in a range of from 0.1 to 1.9, and m+n=2; and wherein the content of the epoxide represented by the formula (2) is in a range of from 0.01 to 0.8 moles per mole of the magnesium compound represented by the formula (1).

In some embodiments, the present invention provides a method for preparing the catalyst component, which method comprises the steps of:

(1) preparing a solid component by a process comprising:

(a) reacting a magnesium halide of formula $MgX_2$ with an alcohol of formula $R_fOH$ in the presence of at least one polymeric dispersion stabilizer at 30 to 160° C. in a closed vessel, to form a magnesium halide-alcohol adduct solution; and (b) reacting the magnesium halide-alcohol adduct solution with an epoxide represented by formula (2):

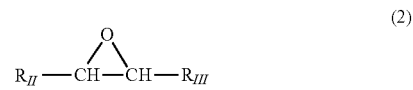

at 30 to 160° C., to form a solid component, wherein, X is halogen; $R_I$ is a $C_1$-$C_{12}$ linear or branched alkyl; $R_{II}$ and $R_{III}$ are identical or different, and are independently hydrogen or unsubstituted or halogen-substituted $C_1$-$C_5$ linear or branched alkyl, and wherein, relative to one mole of the magnesium halide, the amount of the alcohol used ranges from 3 to 30 moles and the amount of the epoxide represented by the formula (2) used ranges from 1 to 10 moles, and the polymeric dispersion stabilizer is used in an amount of from 0.1 to 10 wt %, based on the total weight of the magnesium halide and the alcohol; and (2) contacting and reacting the solid component from step (1) with a titanium compound in the presence or absence of an inert solvent, and adding at least two internal electron donors at one or more stages before, during and/or after the reaction.

In some embodiments, the present invention provides a catalyst component for olefin polymerization prepared by the above-described method.

In some embodiments, the present invention provides a catalyst for olefin polymerization, comprising:

(i) the catalyst component for olefin polymerization according to the present invention;

(ii) at least one alkyl aluminum compound; and (iii) optionally, at least one external electron donor.

In some embodiments, the present invention provides use of the catalyst for olefin polymerization in olefin polymerization reaction.

By means of these technical solutions, the present invention achieves the following virtues:

(1) in the preparation of the solid component, solid particles having good particle morphology and narrow particle size distribution can be obtained without adding an inert dispersion medium, thereby enhancing the solid component output of unit volume of reactor;

(2) compared to the inert dispersion media used in the prior art, the polymeric dispersion stabilizer used in the preparation of the solid component can be recovered more easily, thereby reducing the costs associated with the recovering;

(3) when the catalysts for olefin polymerization according to the invention are used in olefin polymerization (especially propylene polymerization or copolymerization), the resultant polymers have relatively high isotacticities; and (4) the catalysts for olefin polymerization according to the invention exhibit high activities.

These and other features and virtues of the invention will be apparent from the following description in details.

BRIEF DESCRIPTION OF DRAWINGS

The drawings are provided to further illustrate the invention and constitute a part of the specification. The drawings and the following description together explain the invention, but do not limit the invention. In the drawings.

DETAILED DESCRIPTION OF THE PREFERRED EMBODIMENTS

Figure 1:
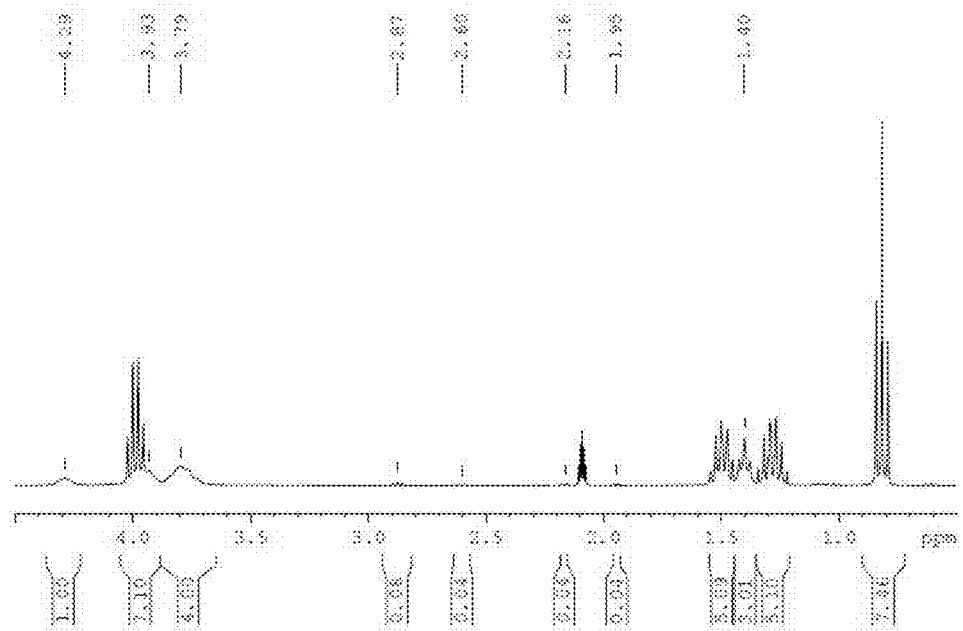
FIG. 1 shows a $^1$H-NMR spectrum of the solid component prepared in Preparation Example 1.

In a first aspect, the present invention provides a catalyst component for olefin polymerization, comprising reaction products of the following components:

(1) a solid component;
(2) at least one titanium compound; and
(3) at least two internal electron donors;

wherein the solid component comprises a magnesium compound represented by formula (1) and an epoxide represented by formula (2),

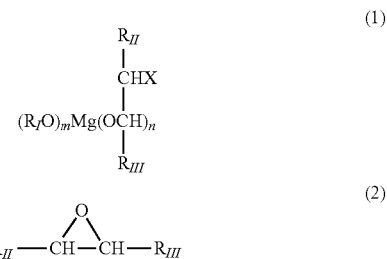

wherein, $R_I$ is a $C_1$-$C_{12}$ linear or branched alkyl; $R_{II}$ and $R_{III}$ are identical or different, and are independently hydrogen or unsubstituted or halogen-substituted $C_1$-$C_5$ linear or branched alkyl; X is halogen; m is in a range of from 0.1 to 1.9, n is in a range of from 0.1 to 1.9, and m+n=2; and wherein the content of the epoxide represented by the formula (2) is in a range of from 0.01 to 0.8 moles per mole of the magnesium compound represented by the formula (1).

In the solid component, $R_I$ is preferably a $C_1$-$C_8$ linear or branched alkyl, and more preferably a $C_2$-$C_5$ linear or branched alkyl, such as ethyl, propyl, butyl or pentyl.

In the solid component, $R_{II}$ and $R_{III}$ are preferably, each independently, hydrogen or unsubstituted or halogen-substituted $C_1$-$C_3$ linear or branched alkyl, and more preferably hydrogen, methyl, ethyl, propyl, chloromethyl, chloroethyl, chloropropyl, bromomethyl, bromoethyl or bromopropyl.

In the solid component, X is preferably bromine, chlorine or iodine, and more preferably chlorine.

Preferably, in the solid component, m is in a range of from 0.5 to 1.5, n is in a range of from 0.5 to 1.5, and m+n=2. Most preferably, m is 1 and n is 1.

In the solid component, the epoxide represented by the formula (2) is preferably at least one of epoxy ethane, epoxy propane, epoxy butane, epoxy chloropropane, epoxy chlorobutane, epoxy bromopropane, and epoxy bromobutane.

In the solid component, the content of the epoxide represented by the formula (2) is preferably in a range of from 0.02 to 0.5 moles, more preferably from 0.02 to 0.3 moles, and still more preferably from 0.02 to 0.1 moles, per mole of the magnesium compound represented by the formula (1).

The solid component is preferably present in the form of spherical particles and has an average particle size (D50) of from 30 to 125 µm, and more preferably from 40 to 85 µm. The solid component has preferably a particle size distribution value (SPAN=(D90−D10)/D50) of from 0.6 to 2.5, and more preferably from 0.6 to 0.85. The average particle size and the particle size distribution value of the solid component particles may be measured on Masters Sizer Model 2000 (manufactured by Malvern Instruments Co., Ltd.).

In the reaction to form the catalyst component, relative to one mole of the magnesium compound represented by the formula (1) in the solid component, the titanium compound may be used in an amount of from 5 to 200 moles, and preferably from 10 to 50 moles; and the internal electron donors may be used in an amount of from 0.04 to 0.6 moles, preferably from 0.07 to 0.5 moles, and more preferably from 0.1 to 0.4 moles.

According to the present invention, the titanium compound may be any titanium compound commonly used in the art. For example, the titanium compound may be chosen from those represented by a formula $Ti(OR_{IV})_{4-a}X_a$, wherein $R_{IV}$ may be a $C_1$-$C_{14}$ aliphatic hydrocarbyl, preferably a C1-C8 alkyl, such as methyl, ethyl, propyl, butyl, pentyl, hexyl, heptyl, or the like, X may be halogen, such as F, Cl, Br, I or a combination thereof, and a is an integer ranging from 1 to 4. Preferably, the titanium compound is chosen from titanium tetrachloride, titanium tetrabromide, titanium tetraiodide, tetrabutoxy titanium, tetraethoxy titanium, tributoxy titanium chloride, dibutoxy titanium dichloride, butoxy titanium trichloride, triethoxy titanium chloride, diethoxy titanium dichloride, and ethoxy titanium trichloride.

According to the present invention, the internal electron donors may be a combination of any two conventional internal electron donors. Preferably, in order that the olefin polymerization catalyst using said catalyst component exhibits enhanced catalytic activity in olefin polymerization and gives olefin polymer having enhanced isotacticity, the internal electron donors are a combination of a first internal electron donor and a second internal electron donor, wherein the first internal electron donor is at least one ester of diol, and the second internal electron donor is at least one diether compound. More preferably, the molar ratio of the first internal electron donor to the second internal electron donor is in a range of from 0.55:1 to 50:1, preferably from 0.6:1 to 30:1, and more preferably from 0.65:1 to 10:1.

The ester of diol may be any of the esters of diol conventionally used as internal electron donors in the art. Preferably, the ester of diol is chosen from those represented by formula (3):

$$R_1-\overset{O}{\overset{\|}{C}}-O-\overset{R_3}{\underset{R_4}{\overset{|}{C}}}-\left[\overset{R^{n+1}}{\underset{R^1}{\overset{|}{C}}}-\cdots-\overset{R^{2n}}{\underset{R^n}{\overset{|}{C}}}\right]-\overset{R_5}{\underset{R_6}{\overset{|}{C}}}-O-\overset{O}{\overset{\|}{C}}-R_2 \qquad (3)$$

wherein, $R_1$ and $R_2$ are identical or different, and are independently $C_1$-$C_{10}$ linear or branched alkyl, $C_3$-$C_{20}$ cycloalkyl, $C_6$-$C_{20}$ aryl, $C_7$-$C_{20}$ alkylaryl or $C_7$-$C_{20}$ arylalkyl, with the hydrogen atom(s) on the phenyl ring in the aryl, alkylaryl and arylalkyl being optionally substituted by halogen atom(s); $R_3$-$R_6$ and $R^1$-$R^{2n}$ are identical or different, and are independently hydrogen, halogen, $C_1$-$C_{20}$ linear or branched alkyl, $C_3$-$C_{20}$ cycloalkyl, $C_6$-$C_{20}$ aryl, $C_7$-$C_{20}$ alkylaryl, $C_7$-$C_{20}$ arylalkyl, $C_2$-$C_{10}$ alkenyl or $C_{10}$-$C_{20}$ fused-ring aryl, with carbon atom(s) and/or hydrogen atom(s) in $R_3$-$R_6$ and $R^1$-$R^{2n}$ being optionally replaced by heteroatom(s), which is/are chosen from nitrogen, oxygen, sulfur, silicon, phosphorus and halogen, and two or more of $R_3$ to $R_6$ and $R^1$ to $R^{2n}$ may be linked to form a saturated or unsaturated ring; and n is an integer ranging from 0 to 10.

More preferably, the ester of diol is chosen from those represented by formula (4):

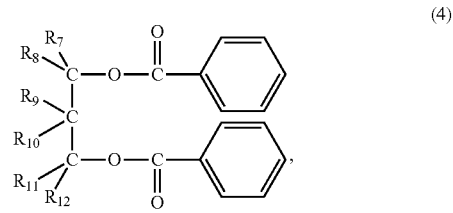

wherein $R_7$-$R_{12}$ are identical or different, and are independently chosen from hydrogen and $C_1$-$C_{20}$ linear or branched alkyl.

Still more preferably, the ester of diol is chosen from 1,3-propylene glycol dibenzoate, 2-methyl-1,3-propylene glycol dibenzoate, 2-ethyl-1,3-propylene glycol dibenzoate, 2-propyl-1,3-propylene glycol dibenzoate, 2-butyl-1,3-propylene glycol dibenzoate, 2,2-dimethyl-1,3-propylene glycol dibenzoate, 2-ethyl-2-butyl-1,3-propylene glycol dibenzoate, 2,2-diethyl-1,3-propylene glycol dibenzoate, 2-methyl-2-propyl-1,3-propylene glycol dibenzoate, 2-isopropyl-2-isopentyl-1,3-propylene glycol dibenzoate, 2,4-pentylene glycol dibenzoate, 3-methyl-2,4-pentylene glycol dibenzoate, 3-ethyl-2,4-pentylene glycol dibenzoate, 3-propyl-2,4-pentylene glycol dibenzoate, 3-butyl-2,4-pentylene glycol dibenzoate, 3,3-dimethyl-2,4-pentylene glycol dibenzoate, 2-methyl-1,3-pentylene glycol dibenzoate, 2,2-dimethyl-1,3-pentylene glycol dibenzoate, 2-ethyl-1,3-pentylene glycol dibenzoate, 2-butyl-1,3-pentylene glycol dibenzoate, 2-methyl-1,3-pentylene glycol dibenzoate, 2-ethyl-1,3-pentylene glycol dibenzoate, 2-propyl-1,3-pentylene glycol dibenzoate, 2-butyl-1,3-pentylene glycol dibenzoate, 2,2-dimethyl-1,3-pentylene glycol dibenzoate, 2-methyl-1,3-pentylene glycol dibenzoate, 2,2-dimethyl-1,3-pentylene glycol dibenzoate, 2-ethyl-1,3-pentylene glycol dibenzoate, 2-butyl-1,3-pentylene glycol dibenzoate, 2,2,4-trimethyl-1,3-pentylene glycol dibenzoate, 3-methyl-3-butyl-2,4-pentylene glycol dibenzoate, 2,2-dimethyl-1,5-pentylene glycol dibenzoate, 1,6-hexylene glycol dibenzoate, 6-ene-2,4-heptylene glycol dibenzoate, 2-methyl-6-ene-2,4-heptylene glycol dibenzoate, 3-methyl-6-ene-2,4-heptylene glycol dibenzoate, 4-methyl-6-ene-2,4-heptylene glycol dibenzoate, 5-methyl-6-ene-2,4-heptylene glycol dibenzoate, 6-methyl-6-ene-2,4-heptylene glycol dibenzoate, 3-ethyl-6-ene-2,4-heptylene glycol dibenzoate, 4-ethyl-6-ene-2,4-heptylene glycol dibenzoate, 5-ethyl-6-ene-2,4-heptylene glycol dibenzoate, 6-ethyl-6-ene-2,4-heptylene glycol dibenzoate, 3-propyl-6-ene-2,4-heptylene glycol dibenzoate, 4-propyl-6-ene-2,4-heptylene glycol dibenzoate, 5-propyl-6-ene-2,4-heptylene glycol dibenzoate, 6-propyl-6-ene-2,4-heptylene glycol dibenzoate, 3-butyl-6-ene-2,4-heptylene glycol dibenzoate, 4-butyl-6-ene-2,4-heptylene glycol dibenzoate, 5-butyl-6-ene-2,4-heptylene glycol dibenzoate, 6-butyl-6-ene-2,4-heptylene glycol dibenzoate, 3,5-dimethyl-6-ene-2,4-heptylene glycol dibenzoate, 3,5-diethyl-6-ene-2,4-heptylene glycol dibenzoate, 3,5-dipropyl-6-ene-2,4-heptylene glycol dibenzoate, 3,5-dibutyl-6-ene-2,4-heptylene glycol dibenzoate, 3,3-dimethyl-6-ene-2,4-heptylene glycol dibenzoate, 3,3-diethyl-6-ene-2,4-heptylene glycol dibenzoate, 3,3-dipropyl-6-ene-2,4-heptylene glycol dibenzoate, 3,3-dibutyl-6-ene-2,4-heptylene glycol dibenzoate, 3,5-heptylene glycol dibenzoate, 2-methyl-3,5-heptylene glycol dibenzoate, 3-methyl-3,5-heptylene glycol dibenzoate, 4-methyl-3,5-heptylene glycol dibenzoate, 5-methyl-3,5-heptylene glycol dibenzoate, 6-methyl-3,5-heptylene glycol dibenzoate, 3-ethyl-3,5-heptylene glycol dibenzoate, 4-ethyl-3,5-heptylene glycol dibenzoate, 5-ethyl-3,5-heptylene glycol dibenzoate, 3-propyl-3,5-heptylene glycol dibenzoate, 4-propyl-3,5-heptylene glycol dibenzoate, 3-butyl-3,5-heptylene glycol dibenzoate, 2,3-dimethyl-3,5-heptylene glycol dibenzoate, 2,4-dimethyl-3,5-heptylene glycol dibenzoate, 2,5-dimethyl-3,5-heptylene glycol dibenzoate, 2,6-dimethyl-3,5-heptylene glycol dibenzoate, 3,3-dimethyl-3,5-heptylene glycol dibenzoate, 4,4-dimethyl-3,5-heptylene glycol dibenzoate, 6,6-dimethyl-3,5-heptylene glycol dibenzoate, 2,6-dimethyl-3,5-heptylene glycol dibenzoate, 3,4-dimethyl-3,5-heptylene glycol dibenzoate, 3,5-dimethyl-3,5-heptylene glycol dibenzoate, 3,6-dimethyl-3,5-heptylene glycol dibenzoate, 4,5-dimethyl-3,5-heptylene glycol dibenzoate, 4,6-dimethyl-3,5-heptylene glycol dibenzoate, 4,4-dimethyl-3,5-heptylene glycol dibenzoate, 6,6-dimethyl-3,5-heptylene glycol dibenzoate, 2-methyl-3-ethyl-3,5-heptylene glycol dibenzoate, 2-methyl-4-ethyl-3,5-heptylene glycol dibenzoate, 2-methyl-5-ethyl-3,5-heptylene glycol dibenzoate, 3-methyl-3-ethyl-3,5-heptylene glycol dibenzoate, 3-methyl-4-ethyl-3,5-heptylene glycol dibenzoate, 3-methyl-5-ethyl-3,5-heptylene glycol dibenzoate, 4-methyl-3-ethyl-3,5-heptylene glycol dibenzoate, 4-methyl-4-ethyl-3,5-heptylene glycol dibenzoate, 4-methyl-5-ethyl-3,5-heptylene glycol dibenzoate, 2-methyl-3-propyl-3,5-heptylene glycol dibenzoate, 2-methyl-4-propyl-3,5-heptylene glycol dibenzoate, 2-methyl-5-propyl-3,5-heptylene glycol dibenzoate, 3-methyl-3-propyl-3,5-heptylene glycol dibenzoate, 3-methyl-4-propyl-3,5-heptylene glycol dibenzoate, 3-methyl-5-propyl-3,5-heptylene glycol dibenzoate, 4-methyl-3-propyl-3,5-heptylene glycol dibenzoate, 4-methyl-4-propyl-3,5-heptylene glycol dibenzoate and 4-methyl-5-propyl-3,5-heptylene glycol dibenzoate.

Most preferably, the ester of diol is chosen from the above-mentioned esters of pentylene glycol and the above-mentioned esters of heptylene glycol.

The diether compound may be any of diether compounds conventionally used as internal electron donors in the art. Preferably, the diether compound is chosen from those represent by formula (5):

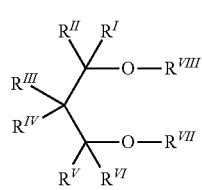

(5)

wherein $R^I$, $R^{II}$, $R^{III}$, $R^{IV}$, $R^V$ and $R^{VI}$ are identical or different, and are independently chosen from hydrogen, halogen, linear or branched $C_1$-$C_{20}$ alkyl, $C_3$-$C_{20}$ cycloalkyl, $C_6$-$C_{20}$ aryl, $C_7$-$C_{20}$ arylalkyl and $C_7$-$C_{20}$ alkylaryl; $R^{VII}$ and R' are identical or different, and are independently chosen from linear or branched $C_1$-$C_{20}$ alkyl, $C_3$-$C_{20}$ cycloalkyl, $C_6$-$C_{20}$ aryl, $C_7$-$C_{20}$ alkylaryl and $C_7$-$C_{20}$ arylalkyl; and two or more of the $R^I$-$R^{VI}$ groups are optionally linked to form a ring.

More preferably, the diether compound is chosen from those represented by a general formula: $R^1R^2C(CH_2OR^3)(CH_2OR^4)$, wherein $R^1$ and $R^2$ are identical or different, and are independently chosen from linear or branched $C_1$-$C_{18}$ alkyl, $C_3$-$C_{18}$ cycloalkyl, $C_6$-$C_{18}$ aryl and $C_7$-$C_{18}$ arylalkyl, and are optionally linked to form a ring; $R^3$ and $R^4$ are identical or different, and are independently a linear or branched $C_1$-$C_{10}$ alkyl.

Still more preferably, the diether compound is chosen from 2-(2-ethylhexyl)-1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2,2-dicyclohexyl-1,3-dimethoxypropane, 2,2-dicyclopentyl-1,3-dimethoxypropane, 2,2-diethyl-1,3-dimethoxypropane, 2,2-dipropyl-1,3-dimethoxypropane, 2,2-diisopropyl-1,3-dimethoxypropane, 2,2-dibutyl-1,3-dimethoxypropane, 2-methyl-2-propyl-1,3-dimethoxypropane, 2-methyl-2-benzyl-1,3-dimethoxypropane, 2-methyl-2-ethyl-1,3-dimethoxypropane, 2-methyl-2-isopropyl-1,3-dimethoxypropane, 2-methyl-2-phenyl-1,3-dimethoxypropane, 2-methyl-2-cyclohexyl-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2,2-bis(cyclohexylmethyl)-1,3-dimethoxypropane, 2-isobutyl-2-isopropyl-1,3-dimethoxypropane, 2-(1-methylbutyl)-2-isopropyl-1,3-dimethoxypropane, 2-isopropyl-2-isopentyl-1,3-dimethoxypropane, 2-phenyl-2-isopropyl-1,3-dimethoxypropane, 2-phenyl-2-sec-butyl-1,3-dimethoxypropane, 2-benzyl-2-isopropyl-1,3-dimethoxypropane, 2-cyclopentyl-2-isopropyl-1,3-dimethoxypropane, 2-cyclopentyl-2-sec-butyl-1,3-dimethoxypropane, 2-cyclohexyl-2-isopropyl-1,3-dimethoxypropane, 2-cyclohexyl-2-sec-butyl-1,3-dimethoxypropane, 2-isopropyl-2-sec-butyl-1,3-dimethoxypropane, 2-cyclohexyl-2-cyclohexylmethyl-1,3-dimethoxypropane and 9,9-dimethoxymethylfluorene.

Most preferably, the diether compound is chosen from 2-isopropyl-2-isopentyl-1,3-dimethoxypropane and 9,9-dimethoxymethylfluorene.

In a second aspect, the present invention provides a method for preparing a catalyst component for olefin polymerization, comprising the steps of:

(1) preparing a solid component by a process comprising:

(a) reacting a magnesium halide of formula $MgX_2$ with an alcohol of formula $R_IOH$ in a vessel, preferably a closed vessel, in the presence of at least one polymeric dispersion stabilizer at 30 to 160° C., to form a magnesium halide-alcohol adduct solution; and (b) reacting the magnesium halide-alcohol adduct solution with an epoxide represented by formula (2):

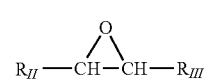

(2)

at 30 to 160° C., to directly precipitate a solid component, wherein X is halogen; $R_I$ is a $C_1$-$C_{12}$ linear or branched alkyl; $R_{II}$ and $R_{III}$ are identical or different, and are independently hydrogen or unsubstituted or halogen-substituted $C_1$-$C_5$ linear or branched alkyl, and wherein, relative to one mole of the magnesium halide, the amount of the alcohol used ranges from 3 to 30 moles and the amount of the epoxide represented by the formula (2) used ranges from 1 to 10 moles, and the polymeric dispersion stabilizer is used in an amount of from 0.1 to 10 wt %, based on the total weight of the magnesium halide and the alcohol; and (2) contacting and reacting the solid component from step (1) with a titanium compound in the presence or absence of an inert solvent, and adding at least two internal electron donors at one or more stages before, during and/or after the reaction.

As used herein, the expression "directly precipitate a solid component" has the following meanings:

(1) the solid component is precipitated through chemical reaction, that is, in the preparation, the solid component is directly precipitated, through chemical reaction, from the original system, and there is no need to use other means such as vaporizing a solvent or altering system temperature (such as spray drying, reducing system temperature) to precipitate solid particles from the reactants; and (2) the acquirement of the shape (typically spherical shape) of the solid component can be achieved without needing to introduce an inert carrier material having good particle morphology (for example, $SiO_2$, metal oxides, or the like) in the preparation.

In step (1), preferably, relative to one mole of the magnesium halide, the amount of the alcohol used ranges from 4 to 20 moles and the amount of the epoxide represented by the formula (2) used ranges from 2 to 6 moles, and the polymeric dispersion stabilizer is used in an amount of from 0.2 to 5 wt %, based on the total weight of the magnesium halide and the alcohol.

In the magnesium halide $MgX_2$, X is preferably bromine, chlorine or iodine. The magnesium halide is more preferably at least one chosen from magnesium dichloride, magnesium dibromide and magnesium diiodide, and most preferably magnesium dichloride.

In the alcohol $R_IOH$, $R_I$ is preferably a $C_1$-$C_8$ linear or branched alkyl, more preferably a $C_2$-$C_5$ linear or branched alkyl, such as ethyl, propyl, butyl or pentyl. Particularly, the alcohol may be at least one chosen from methanol, ethanol, propanol, isopropanol, n-butanol, isobutanol, pentanol, iso-pentanol, n-hexanol, n-octanol, and 2-ethylhexanol.

In the epoxide represented by the formula (2), $R_{II}$ and $R_{III}$ are preferably, each independently, hydrogen or unsubstituted or halogen-substituted $C_1$-$C_3$ linear or branched alkyl, and more preferably hydrogen, methyl, ethyl, propyl, chloromethyl, chloroethyl, chloropropyl, bromomethyl, bromoethyl or bromopropyl. Particularly, the epoxide may be at least one chosen from epoxy ethane, epoxy propane, epoxy butane, epoxy chloropropane, epoxy chlorobutane, epoxy bromopropane, and epoxy bromobutane.

According to the invention, there is no specific limitation on the molecular weight of the polymeric dispersion stabilizer. However, it is preferred that the polymeric dispersion stabilizer has a weight average molecular weight of larger than 1,000, more preferably larger than 3,000, still more preferably from 6,000 to 2,000,000. Particularly, the polymeric dispersion stabilizer may be at least one chosen from polyacrylates, styrene-maleic anhydride copolymers, polystyrene sulfonates, naphthalenesulfonic acid-formaldehyde condensation products, condensed alkyl phenyl ether sulfates, condensed alkylphenol polyoxyethylene ether phosphates, oxy alkyl acrylate copolymer-modified polyethyleneimines, poly(1-dodecyl-4-vinylpyridinium bromide)s, poly(vinylbenzyl trimethyl ammonium salt)s, poly(vinyl alcohol)s, polyacrylamides, ethylene oxide-propylene oxide block copolymers, polyvinylpyrrolidones (PVPs), poly(vinylpyrrolidone-co-vinyl acetate)s, poly(ethylene glycol)s (PEGs), alkylphenyl polyoxyethylene ethers and poly(alkyl methylacrylate)s, preferably at least one of polyvinylpyrrolidone, poly(vinylpyrrolidone-co-vinyl acetate)s and poly (ethylene glycol)s.

In step (a) of the process for preparing the solid component, the magnesium halide, the alcohol and the polymeric dispersion stabilizer may participate, in a form comprising a minor amount of water, in the formation of the magnesium halide-alcohol adduct solution. So-called "minor amount of water" means water inevitably introduced during industrial production or storage or transportation, but not added purposely.

In step (a) of the process for preparing the solid component, the magnesium halide, the alcohol and the polymeric dispersion stabilizer may be added in any addition order.

In step (a) of the process for preparing the solid component, reaction time may be in a range of from 0.1 to 5 hours, and preferably from 0.5 to 2 hours.

In step (b) of the process for preparing the solid component, reaction time may be in a range of from 0.1 to 5 hours, and preferably from 0.3 to 1 hour.

Steps (a) and (b) of the process for preparing the solid component utilize optionally an inert dispersion medium. The inert dispersion medium is ones commonly used in the art. For example, the inert dispersion medium may be at least one chosen from liquid aliphatic, aromatic or alicyclic hydrocarbons and silicone oils. Particularly, the inert dispersion medium may be at least one of liquid linear or branched alkanes having a carbon chain length larger than 6 carbons, kerosenes, paraffin oils, vaseline oils, white oils, and methylsilicone oils. Preferably, no inert dispersion medium is used in both steps (a) and (b).

In a preferred embodiment, the process for preparing the solid component comprises:

(i) heating a mixture of the magnesium halide, the alcohol and the at least one polymeric dispersion stabilizer in a closed vessel with stirring to a temperature of from 30 to 160° C., and preferably from 40 to 120° C., and allowing the mixture to react for 0.1 to 5 hours, and preferably 0.5 to 2 hours, to form a magnesium halide-alcohol adduct solution, wherein the amount of the alcohol used ranges from 3 to 30 moles, and preferably from 4 to 25 moles, per mole of the magnesium halide, and the amount of the polymeric dispersion stabilizer used is from 0.1 to 10 wt %, and preferably from 0.2 to 5 wt %, based on the total weight of the magnesium halide and the alcohol; and (ii) adding the epoxide represented by the formula (2) to the magnesium halide-alcohol adduct solution with stirring, and allowing the mixture to react at 30 to 160° C., and preferably 40 to 120° C., for 0.1 to 5 hours, and preferably 0.3 to 1 hour, to form the particulate solid component, wherein the amount of the epoxide used ranges from 1 to 10 moles, and preferably from 2 to 6 moles, per mole of the magnesium halide.

Preferably, the particulate solid component obtained by the above-described process for preparing solid component is washed with an inert hydrocarbon solvent, for example, hexane, heptane, octane, decane, toluene, or the like, and then dried, to ready for being used in the subsequent step (2) to prepare the catalyst component for olefin polymerization.

The step (2) of the inventive method is preferably performed as follows: the solid component is suspended in a titanium compound feed at −30° C. to 0° C., and then the suspension is heated to a temperature of 40 to 130° C. and allowed to react for 0.1 to 5 hours. More preferably, the step (2) of the inventive method is performed as follows: the solid component is suspended in a titanium compound feed at −20° C. to −10° C., and then the suspension is heated to a temperature of 80 to 130° C. and allowed to react for 0.5 to 2 hours. The titanium compound feed may be the pure titanium compound or a mixture of the titanium compound and an inert solvent. The inert solvent may be chosen from aliphatic hydrocarbons and aromatic hydrocarbons, for example, hexanes, heptanes, octanes, decanes, toluene, and the like.

In step (2), the internal electron donors may be added at one or more stages before, during and/or after the reaction of the solid component with the titanium compound, and the at least two internal electron donors may be introduced together or separately at different stages. Preferably, the at least two internal electron donors are introduced in the course of heating the mixture of the solid component and the titanium compound.

Preferably, the method for preparing the catalyst component further comprises: after reacting the solid component with the titanium compound, the liquid is filtered off and solids are recovered. Next, the recovered solids are washed with a liquid titanium compound (for example, titanium tetrachloride) one or more times, and preferably 2 to 4 times, and then with an inert solvent multiple times, to afford the solid catalyst component. The inert solvent may be chosen from aliphatic hydrocarbons and aromatic hydrocarbons, for example, hexanes, heptanes, octanes, decanes, toluene, and the like.

In step (2), relative to one mole of magnesium, the amount of the titanium compound used may range from 5 to 200 moles, and preferably from 10 to 50 moles, and the amount of the internal electron donors used may range from 0.04 to 0.6 moles, preferably from 0.07 to 0.5 moles, and more preferably from 0.1 to 0.4 moles.

In the above method, the titanium compound and the internal electron donors are as described hereinbefore.

In a third aspect, the present invention provides a catalyst component for olefin polymerization prepared by the above-described method.

In a fourth aspect, the present invention provides a catalyst for olefin polymerization comprising:
(i) the catalyst component for olefin polymerization according to the present invention;
(ii) at least one alkyl aluminum compound; and
(iii) optionally, at least one external electron donor.

The alkyl aluminum compound may be any of alkyl aluminum compounds commonly used in the art. For example, the alkyl aluminum may be of general formula AlR'$_3$, wherein R's are independently halogen or unsubstituted or halogen-substituted $C_1$-$C_8$ alkyl, with the proviso that at least one R' is not halogen. Examples of $C_1$-$C_8$ alkyl include, but are not limited to, methyl, ethyl, propyl, n-butyl, isobutyl, pentyl, hexyl, n-heptyl, and n-octyl. The halogen may be fluorine, chlorine, bromine, or iodine. Particularly, the alkyl aluminum compound may be, for example, one or more chosen from triethyl aluminum, triisobutyl aluminum, tri-n-butyl aluminum, tri-n-hexyl aluminum, diethyl aluminum chloride, diisobutyl aluminum chloride, di-n-butyl aluminum chloride, di-n-hexyl aluminum chloride, ethyl aluminum dichloride, isobutyl aluminum dichloride, n-butyl aluminum dichloride and n-hexyl aluminum dichloride.

The external electron donor may be any of external electron donors commonly used in the art. For example, the external electron donor may be chosen from carboxylic acids, carboxylic anhydrides, carboxylic esters, ketones, ethers, alcohols, lactones, organophosphorus compounds and organic silicon compounds. Preferably, the external electron donor is a silicon compound of general formula: $(R_{17})_x(R_{18})_y Si(OR_{19})_z$, wherein $R_{17}$, $R_{18}$ and $R_{19}$ are independently a $C_1$-$C_{18}$ hydrocarbyl optionally comprising a heteroatom, x and y are each independently an integer of from 0 to 2, z is an integer of from 1 to 3, and the sum of x, y and z is 4. Preferably, $R_{17}$ and $R_{18}$ are independently a $C_3$-$C_{10}$ alkyl or cycloalkyl, optionally comprising a heteroatom; $R_{19}$ is a $C_1$-$C_{10}$ alkyl optionally comprising a heteroatom. Particularly, the external electron donor may be, for example, chosen from cyclohexyl methyl dimethoxy silane, diisopropyl dimethoxy silane, di-n-butyl dimethoxy silane, di-iso-butyl dimethoxy silane, diphenyl dimethoxy silane, methyl tert-butyl dimethoxy silane, dicyclopentyl dimethoxy silane, 2-ethylpiperidino tert-butyl dimethoxy silane, 1,1,1-trifluoro-2-propyl 2-ethylpiperidino dimethoxy silane and 1,1,1-trifluoro-2-propyl methyl dimethoxy silane.

In general, in the catalyst for olefin polymerization, a molar ratio of the catalyst component for olefin polymerization in terms of titanium to the alkyl aluminum in terms of aluminum may range from 1:1 to 1:1,000, preferably from 1:20 to 1:500, and a molar ratio of the external electron donor to the alkyl aluminum in terms of aluminum may range from 1:2 to 1:200, preferably from 1:2.5 to 1:100.

According to the present invention, in the preparation of the catalyst for olefin polymerization, the alkyl aluminum and the optional external electron donor compound may be separately mixed with the catalyst component for olefin polymerization and then allowed to react, or the alkyl aluminum and the optional external electron donor may be first mixed together, and then combined and reacted with the catalyst component for olefin polymerization.

According to the present invention, when the catalyst for olefin polymerization is used in an olefin polymerization, the catalyst component for olefin polymerization, the alkyl aluminum, and the optional external electron donor may be added into a polymerization reactor, either separately or after having been mixed together. Alternatively, the catalyst for olefin polymerization may be subjected to an olefin prepolymerization through a prepolymerization process well known in the art and then added into a polymerization reactor.

In a fifth aspect, the invention provides use of the catalyst of the invention in olefin polymerization.

The improvement of the invention resides in that a novel catalyst for olefin polymerization is utilized, while the specific kinds of the olefin to be polymerized as well as the processes and conditions of the olefin polymerization are the same as known in the prior art.

According to the present invention, the above-described catalyst is especially suitable for the homopolymerization and copolymerization of olefins of general formula CH$_2$=CHR, wherein R is hydrogen, $C_1$-$C_6$ alkyl or $C_6$-$C_{12}$ aryl.

According to the present invention, the polymerization of olefin(s) may be carried out according to the known processes. Specifically, the polymerization of olefin(s) may be carried out in liquid phase of monomer(s) or monomer-containing inert solvent, or in gas phase, or in a combination of gas phase and liquid phase, under inert atmosphere. The polymerization temperature is generally in a range of from 0° C. to 150° C., and preferably from 60° C. to 90° C., and the polymerization pressure may be normal pressure or higher, for example, in a range of from 0.01 to 10 MPa (gauge), preferably from 0.01 to 2 MPa (gauge), and more preferably from 0.1 to 2 MPa (gauge). In the polymerization, hydrogen as a regulator of polymer molecular weight may be added to the reaction system to adjust the molecular weight and melt index of a polymer. In addition, the inert gas and solvent used in the olefin polymerization as well as their amounts are well known by a person skilled in the art, and thus this specification does not further describe them.

Thus, according to this aspect of the invention, the present invention further provides a method for olefin polymerization, comprising contacting an olefin of formula $CH_2=CHR$, wherein R is hydrogen, $C_1$-$C_6$ alkyl or $C_6$-$C_{12}$ aryl, and optionally a comonomer with the catalyst of the invention under polymerization conditions, to form an olefin polymer; and recovering the resultant olefin polymer.

In a preferred embodiment, the olefin polymerization is homopolymerization of propylene or copolymerization of propylene and a comonomer. Examples of the comonomer copolymerizable with propylene include ethylene, $C_{4-12}$ α-olefins and $C_{4-20}$ diolefins.

EXAMPLES

The following examples are provided to further illustrate the present invention and by no means intend to limit the scope thereof.

Testing Methods:

1. Composition of solid component: the solid component was dissolved in tri-n-butyl phosphate and deuterotoluene, and $^1$H-NMR spectrum was acquired on a nuclear magnetic resonance spectrometer.
2. Melt index of polymer: measured according to ASTM D1238-99.
3. Isotacticity of polymer: measured by heptane extraction method carried out as follows: 2 g of dry polymer sample was extracted with boiling heptane in an extractor for 6 hours, then the residual substance was dried to constant weight, and the ratio of the weight of the residual polymer (g) to 2 (g) was regarded as isotacticity.
4. Particle size distribution: average particle size and particle size distribution of the solid component particles were measured on Masters Sizer Model 2000 (manufactured by Malvern Instruments Co., Ltd.), with the particle size distribution value being defined as SPAN=(D90−D10)/D50.

Preparation Examples 1 to 17

Figure 2:
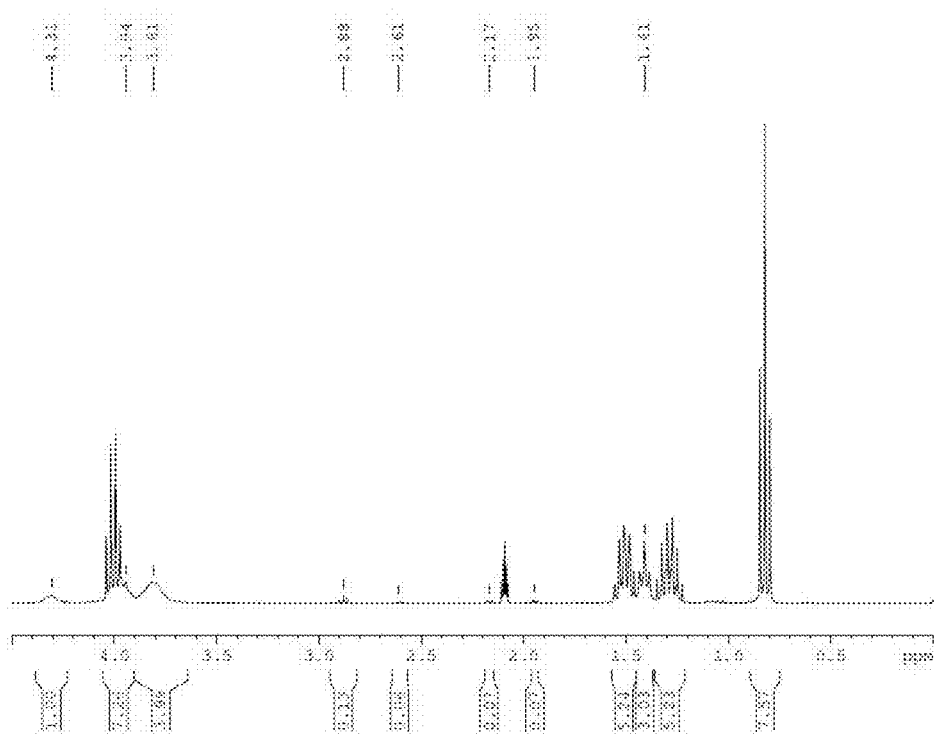
FIG. 2 shows a $^1$H-NMR spectrum of the solid component prepared in Preparation Example 2.
Figure 3:
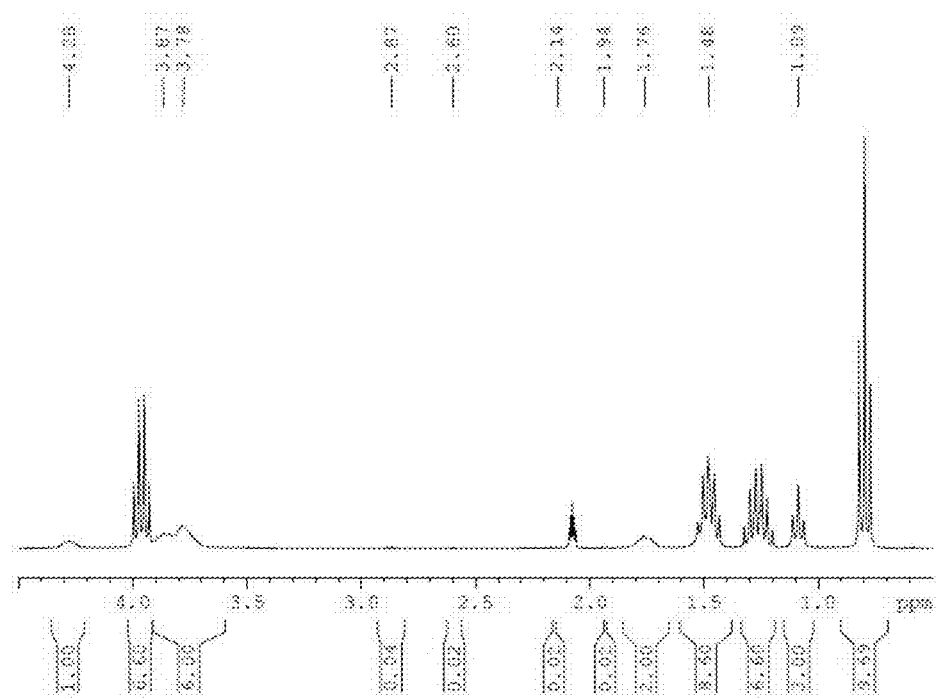
FIG. 3 shows a $^1$H-NMR spectrum of the solid component prepared in Preparation Example 13.
Figure 4:
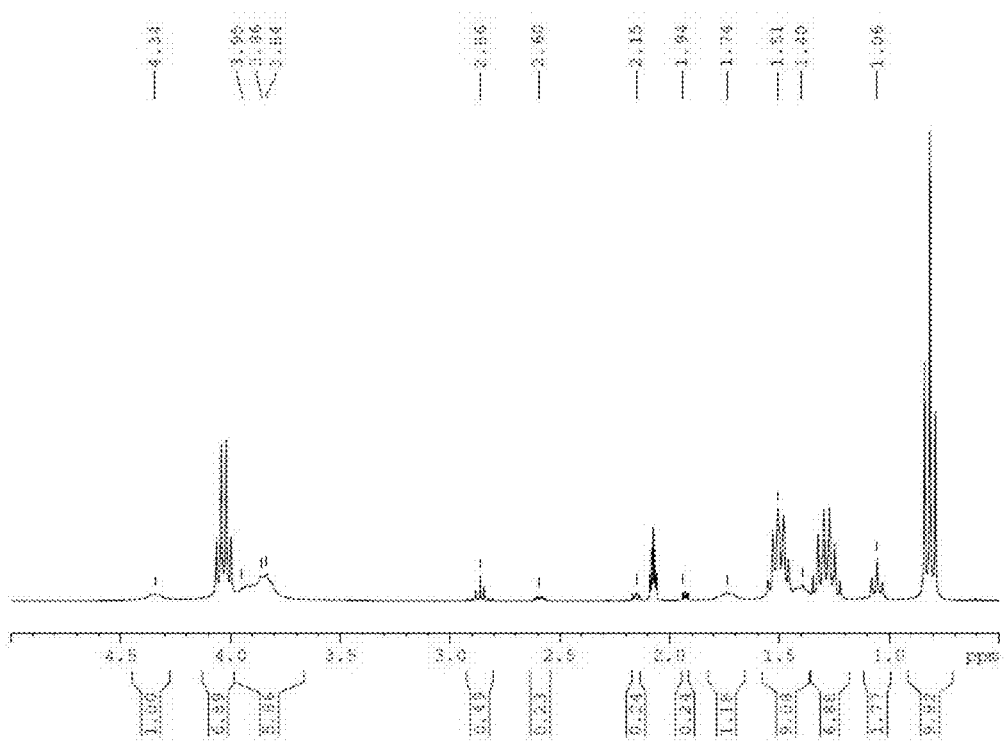
FIG. 4 shows a $^1$H-NMR spectrum of the solid component prepared in Preparation Example 15.

To a 500 mL reactor were charged successively with magnesium chloride, an alcohol ($R_iOH$) and a polymeric dispersion stabilizer. Then, the contents were heated to the reaction temperature (T) with stirring and allowed to react at that temperature for 1 hour. Next, an epoxide (E) was added thereto, and the reaction was continued at that temperature for 0.5 hours. The liquid was filtered off, and the residual solids were washed with hexane 5 times and then dried under vacuum, to afford a particulate solid component. Spherical solid components A1 to A17 were prepared by using the preparation conditions shown in Table 1 below, respectively, and their average particle sizes (D50) and particle size distribution values (SPAN) are shown in Table 1. A $^1$H-NMR spectrum of the solid component A1 is shown in FIG. 1, a $^1$H-NMR spectrum of the solid component A2 is shown in FIG. 2, a $^1$H-NMR spectrum of the solid component A13 is shown in FIG. 3, a $^1$H-NMR spectrum of the solid component A15 is shown in FIG. 4, and an optical microphotograph of the solid component A1 is shown in FIG. 5.

TABLE 1

| Preparation Example No. | Solid Component | T °C. | $R_1(OH)$ | E | $R_1(OH)/MgCl_2$ mol/mol | $E/MgCl_2$ mol/mol | Stabilizer and amount (wt %) | | D50 μm | Span |
|---|---|---|---|---|---|---|---|---|---|---|
| 1 | A1 | 80 | ethanol | epoxy chloropropane | 14 | 3 | PVP(Mw = 10000) | 1.6 | 59.0 | 0.64 |
| 2 | A2 | 80 | ethanol | epoxy chloropropane | 15 | 3 | PVP(Mw = 10000) | 1.4 | 62.3 | 0.65 |
| 3 | A3 | 50 | ethanol | epoxy chloropropane | 18 | 3 | PVP(Mw = 10000) | 1.0 | 61.7 | 0.69 |
| 4 | A4 | 50 | ethanol | epoxy chloropropane | 20 | 3 | PVP(Mw = 8000) | 0.5 | 82.3 | 0.70 |
| 5 | A5 | 70 | ethanol | epoxy chloropropane | 15 | 3 | PVP(Mw = 10000) | 1.4 | 53.9 | 0.68 |
| 6 | A6 | 90 | ethanol | epoxy chloropropane | 14 | 3 | PVP(Mw = 10000) | 12 | 70.3 | 0.68 |
| 7 | A7 | 80 | ethanol | epoxy chloropropane | 14 | 2 | PVP(Mw = 10000) | 1.6 | 72.3 | 0.69 |
| 8 | A8 | 80 | ethanol | epoxy chloropropane | 14 | 2 | PVP(Mw = 10000) | 32 | 65.7 | 0.84 |
| 9 | A9 | 80 | ethanol | epoxy propane | 14 | 4 | PVP(Mw = 10000) | 1.4 | 56.3 | 0.74 |
| 10 | A10 | 80 | ethanol | epoxy chloropropane | 15 | 3 | PVP(Mw = 10000) | 1.8 | 45.5 | 0.69 |
| 11 | A11 | 80 | ethanol | epoxy chloropropane | 15 | 3 | PVP(Mw = 58000) | 1.5 | 61.5 | 0.82 |
| 12 | A12 | 80 | ethanol | epoxy chloropropane | 15 | 3 | PVP(Mw = 130 × 10$^4$) | 1.5 | 57.8 | 2.4 |
| 13 | A13 | 90 | butanol | epoxy chloropropane | 12 | 3 | PVP(Mw = 10000) | 1.5 | 34.7 | 0.65 |
| 14 | A14 | 100 | butanol | epoxy chloropropane | 12 | 3 | PVP(Mw = 10000) | 1.5 | 42.3 | 0.68 |
| 15 | A15 | 90 | ethanol + butanol | epoxy chloropropane | 6 + 6 | 3 | PVP(Mw = 10000) | 1.5 | 53.8 | 0.78 |
| 16 | A16 | 90 | ethanol + isooctanol | epoxy chloropropane | 2 + 2 | 2 | PVP(Mw = 10000) | 1.5 | 33.3 | 1.0 |
| 17 | A17 | 80 | ethanol | epoxy chloropropane | 15 | 3 | PEG(Mw = 6000) | 1.5 | 120.4 | 1.5 |

Figure 5:
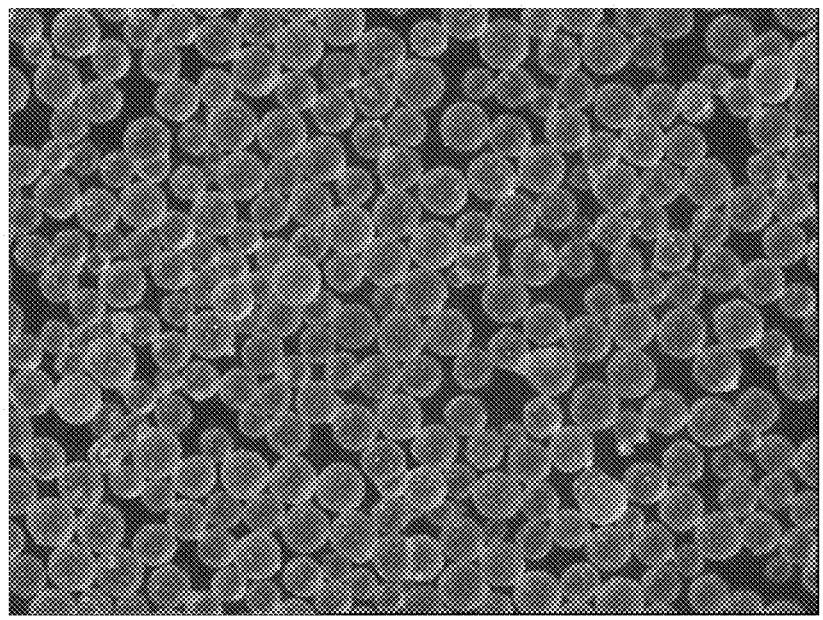
FIG. 5 is an optical microphotograph of the solid component prepared in Preparation Example 1.

It can be seen from Table 1 and FIG. 5 that the particles of the solid components prepared by the inventive method are of sphere shape and have a relatively narrow particle size distribution.

The assignment and integral area of each peak in the $^1$H-NMR spectrum of the solid component A1 are shown in Table 2 below.

TABLE 2

| Assigned group | Chemical shift, ppm | Integral area |
|---|---|---|
| CH$_3$(V) | 1.40 | 3.01 |
| CH$_2$(V) | 3.93 | 7.10 − 5.10 = 2 |
| CH(V) | 4.29 | 1.00 |
| CH$_2$Cl(V) | 3.79 | 4.00 |
| CH$_2$Cl(VI) | 2.87 | 0.08 |
| C—CH—C(VI) | 2.60 | 0.04 |
| C—CH—O(VI) | 2.16 | 0.04 |
| C—CH—O(VI) | 1.95 | 0.04 |

Notation: The peak in FIG. 1 that is not assigned to a group is the solvent peak.

Thus, it can be known that the solid component A1 consists mainly of the compound of the formula (V) and the compound of the formula (VI), with the molar ratio of the compound of the formula (V) to the compound of the formula (VI) being 1:0.04.

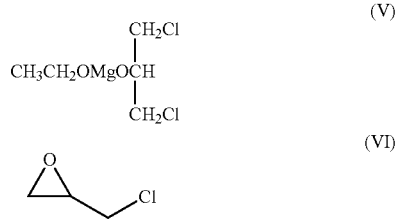

(V)

(VI)

The assignment and integral area of each peak in the $^1$H-NMR spectrum of the solid component A2 are shown in Table 3 below.

TABLE 3

| Assigned group | Chemical shift, ppm | Integral area |
|---|---|---|
| CH$_3$(V) | 1.41 | 3.03 |
| CH$_2$(V) | 3.94 | 7.26 − 5.23 = 2.03 |
| CH(V) | 4.31 | 1.00 |
| CH$_2$Cl(V) | 3.81 | 3.99 |
| CH$_2$Cl(VI) | 2.88 | 0.13 |
| C—CH—C(VI) | 2.61 | 0.06 |
| C—CH—O(VI) | 2.17 | 0.07 |
| C—CH—O(VI) | 1.95 | 0.07 |

Notation: The peak in FIG. 2 that is not assigned to a group is the solvent peak.

Thus, it can be known that the solid component A2 consists mainly of the compound of the formula (V) and the compound of the formula (VI), with the molar ratio of the compound of the formula (V) to the compound of the formula (VI) being 1:0.07.

The assignment and integral area of each peak in the $^1$H-NMR spectrum of the solid component A13 are shown in Table 4 below.

TABLE 4

| Assigned group | Chemical shift, ppm | Integral area |
|---|---|---|
| CH$_3$(VII) | 1.09 | 3.00 |
| CH$_2$(VII) | 3.87 | 2.00 |
| CH$_2$(VII) | 1.76 | 2.00 |
| CH$_2$(VII) | 1.48 | 8.60 − 6.60 = 2.00 |
| CH(VII) | 4.28 | 1.00 |
| CH$_2$Cl(VII) | 3.78 | 6.00 − 2.00 = 4.00 |
| CH$_2$Cl(VI) | 2.87 | 0.04 |
| C—CH—C(VI) | 2.60 | 0.02 |
| C—CH—O(VI) | 2.14 | 0.02 |
| C—CH—O(VI) | 1.94 | 0.02 |

Notation: The peak in FIG. 3 that is not assigned to a group is the solvent peak.

Thus, it can be known that the solid component A13 consists mainly of the compound of formula (VII) and the compound of formula (VI), with the molar ratio of the compound of the formula (VII) to the compound of the formula (VI) being 1:0.02.

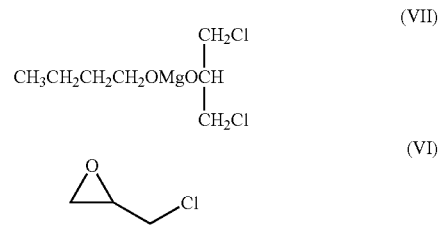

(VII)

(VI)

The assignment and integral area of each peak in the $^1$H-NMR spectrum of the solid component A15 are shown in Table 5 below.

TABLE 5

| Assigned group | Chemical shift, ppm | Integral area |
|---|---|---|
| CH$_3$(V) | 1.40 | 9.08 − 6.88 − 1.18 = 1.02 |
| CH$_2$(V) | 3.95 | 5.86 − 4 − 1.18 = 0.68 |
| CH$_3$(VII) | 1.06 | 1.77 |
| CH$_2$(VII) | 3.86 | 1.18 |
| CH$_2$(VII) | 1.74 | 1.18 |
| CH$_2$(VII) | 1.51 | 1.18 |
| CH(VII) | 4.34 | 1.00 |
| CH$_2$Cl(VII) | 3.84 | 4.00 |
| CH$_2$Cl(VI) | 2.86 | 0.49 |
| C—CH—C(VI) | 2.60 | 0.23 |
| C—CH—O(VI) | 2.15 | 0.24 |
| C—CH—O(VI) | 1.94 | 0.24 |

Notation: The peak in FIG. 4 that is not assigned to a group is the solvent peak.

Thus, it can be known that the solid component A15 consists mainly of the compound of the formula (V), the compound of the formula (VI) and the compound of the formula (VII), with the molar ratio of the compound of the formula (VI) to the sum of the compound of the formula (V) and the compound of the formula (VII) is 0.24:1, and the molar ratio of the compound of the formula (VI) to the compound of the formula (VII) is 1:1.74.

Comparative Example 1

A solid component was prepared according to the procedure described in Preparation Example 1, except that the PVP (polyvinylpyrrolidone) used in Preparation Example 1 was replaced with 180 mL of white oil, thereby affording spherical solid component D1.

Comparative Example 2

Figure 6:
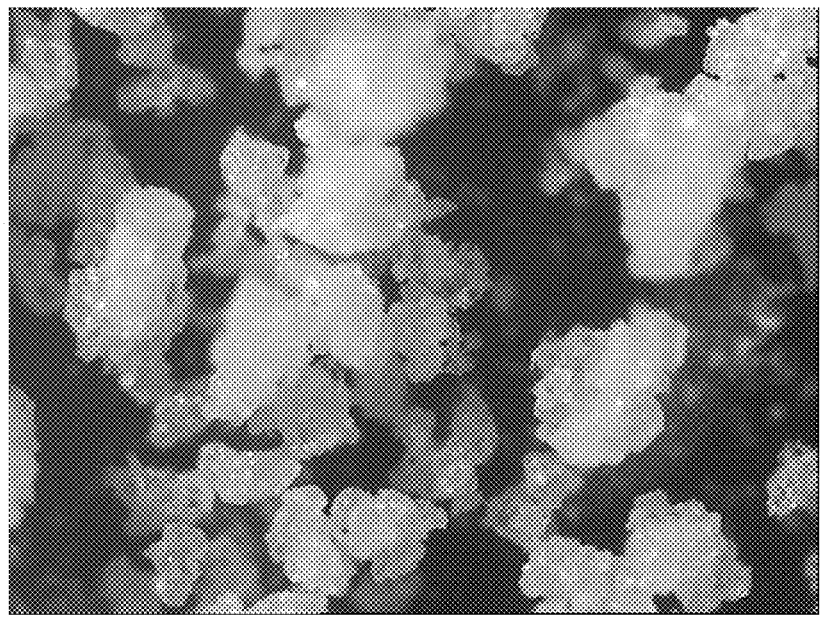
FIG. 6 is an optical microphotograph of the solid component prepared in Comparative Example 2.

A solid component was prepared according to the procedure described in Preparation Example 1, except that the PVP used in Preparation Example 1 was replaced with the same weight of nonionic surfactant Span 80, thereby affording lump solid component D2. An optical microphotograph of this solid component is shown in FIG. 6.

Comparative Example 3

A solid component was prepared according to the procedure described in Preparation Example 1, except that the polymeric dispersion stabilizer PVP was omitted, thereby affording lump solid component D3.

Example 1

This example is used to illustrate the inventive catalyst component for olefin polymerization, the preparation thereof, catalyst for olefin polymerization and its use.

(1) Preparation of Catalyst Component 100 mL of titanium tetrachloride was added to a 300 mL glass reactor and cooled to −20° C. Then 8 g of the solid component A1 from Preparation Example 1 was added to the reactor, and the contents were heated to 110° C., with 4.4 mmol of 2,4-pentylene glycol dibenzoate and 5.2 mmol of 2-isopropyl-2-isopentyl-1,3-dimethoxypropane being added to the reactor during the heating. After the contents were maintained at 110° C. for 0.5 hours, the liquid was removed through filtration under vacuum, and the residues were wished with titanium tetrachloride twice and with hexane thrice, and then dried under vacuum to give a solid catalyst component Cat-1.

(2) Liquid Phase Bulk Polymerization of Propylene

A liquid phase bulk polymerization of propylene was conducted in a 5 L stainless steel autoclave as follows: under nitrogen atmosphere, to the autoclave were charged successively with 1 ml solution of triethyl aluminum in hexane (having a concentration of 0.5 mmol/ml), 0.1 ml solution of cyclohexyl methyl dimethoxy silane (CHMMS) in hexane (having a concentration of 0.1 mmol/ml), and 4 mg of the above-prepared solid catalyst Cat-1. The autoclave was closed, and then a certain amount (standard volume) of hydrogen gas and 2.3 L of liquid propylene were introduced thereto. The contents were heated to 70° C., and polymerization was allowed to continue at 70° C. for 1 hour. The autoclave was cooled, vented, and discharged. The obtained propylene homopolymer was dried and then weighed. The results are shown in Table 6 below.

Example 2

This example is used to illustrate the inventive catalyst component for olefin polymerization, the preparation thereof, catalyst for olefin polymerization and its use.

According to the procedure described in Example 1, a catalyst component was prepared and liquid phase bulk polymerization of propylene was carried out, except that in the preparation of the catalyst component, the used solid component is the solid component A2 prepared in Preparation Example 2, and internal electron donors were added in the following manner: 2.1 mmol of 2,4-pentylene glycol dibenzoate and 2.5 mmol of 2-isopropyl-2-isopentyl-1,3-dimethoxypropane were added at the beginning of the heating, and 2.3 mmol of 2,4-pentylene glycol dibenzoate and 2.8 mmol of 9,9-dimethoxymethylfluorene were added when the temperature was enhanced to near the target temperature (i.e., 110° C.). The results are shown in Table 6 below.

Example 3

This example is used to illustrate the inventive catalyst component for olefin polymerization, the preparation thereof, catalyst for olefin polymerization and its use.

According to the procedure described in Example 1, a catalyst component was prepared and liquid phase bulk polymerization of propylene was carried out, except that in the preparation of the catalyst component, the used solid component is the solid component A13 prepared in Preparation Example 13, and internal electron donors were added in the following manner: 5 mmol of 3-butyl-3,5-heptylene glycol dibenzoate was added at the beginning of the heating, and 5.2 mmol of 9,9-dimethoxymethylfluorene was added when the temperature was enhanced to near the target temperature (i.e., 110° C.). The results are shown in Table 6 below.

Comparative Example 4

According to the procedure described in Example 1, a catalyst component was prepared and liquid phase bulk polymerization of propylene was carried out, except that in the preparation of the catalyst component, the used solid component is the solid component D1 prepared in Comparative Example 1. The results are shown in Table 6 below.

TABLE 6

| Example No. | Solid component | Al/Si (mol/mol) | Amount of hydrogen gas (NL) | Polymerization Activity (KgPP/gCat) | Isotactic index of polymer (wt %) | Melt index of polymer (g/10 min) |
|---|---|---|---|---|---|---|
| Example 1 | A1 | — | 2 | 125.4 | 98.8 | 2.0 |
| | A1 | 50 | 6.5 | 121.6 | 98.2 | 12.4 |
| Example 2 | A2 | — | 2 | 115.1 | 98.6 | 2.1 |
| | A2 | 50 | 6.5 | 104.0 | 97.8 | 13.7 |
| Example 3 | A13 | — | 2 | 100.0 | 97.7 | 2.6 |
| | A13 | 50 | 2 | 99.1 | 98.3 | 2.7 |
| | A13 | 50 | 6.5 | 86.1 | 97.8 | 25.3 |
| Comparative Example 4 | D1 | 50 | 2 | 33.6 | 97.0 | 7.5 |

Notation: "—" indicates that no external electron donor was uses.

It can be seen from the data in Table 6 that, when the catalyst of the invention is used in propylene polymerization, a high polymerization activity and a high stereo-directing ability can be obtained and, at the same time, the olefin polymerization catalyst of the invention has a good hydrogen response. Particularly, when the catalyst of the invention is used to carry out propylene polymerization, the resulting polymer has a high isotactic index, even when it has a high melt index.

What is claimed is:

1. A catalyst component for olefin polymerization, comprising reaction products of the following components:
   (1) a solid component;
   (2) at least one titanium compound; and
   (3) at least two internal electron donors;
   wherein the solid component comprises a magnesium compound represented by formula (1) and an epoxide represented by formula (2),

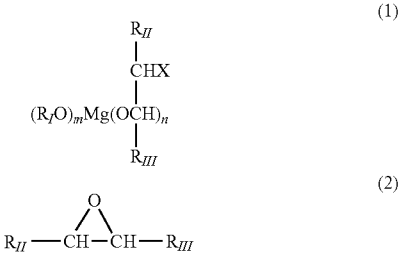

wherein, $R_I$ is a $C_1$-$C_{12}$ linear or branched alkyl; $R_{II}$ and $R_{III}$ are identical or different, and are independently hydrogen or unsubstituted or halogen-substituted $C_1$-$C_5$ linear or branched alkyl; X is halogen; m is in a range of from 0.1 to 1.9, n is in a range of from 0.1 to 1.9, and m+n=2;
   wherein the content of the epoxide represented by the formula (2) is in a range of from 0.01 to 0.8 moles per mole of the magnesium compound represented by the formula (1); and
   wherein the solid component is obtained by reacting a magnesium halide-alcohol adduct solution with the epoxide represented by the formula (2) in the presence of at least one polymeric dispersion stabilizer.

2. The catalyst component according to claim 1, wherein, $R_I$ is a $C_1$-$C_8$ linear or branched alkyl; $R_{II}$ and $R_{III}$ are independently hydrogen or unsubstituted or halogen-substituted $C_1$-$C_3$ linear or branched alkyl; X is chlorine; m is in a range of from 0.5 to 1.5, n is in a range of from 0.5 to 1.5, and m+n=2.

3. The catalyst component according to claim 1, wherein, in the solid component, the content of the epoxide represented by the formula (2) is in a range of from 0.02 to 0.5 moles per mole of the magnesium compound represented by the formula (1).

4. The catalyst component according to claim 1, wherein, relative to one mole of the magnesium compound represented by the formula (1) in the solid component, the amount of the titanium compound is from 5 to 200 moles; and the amount of the internal electron donors is from 0.04 to 0.6 moles.

5. The catalyst component according to claim 1, wherein the titanium compound is chosen from those of formula $Ti(OR_{IV})_{4-a}X_a$, wherein $R_{IV}$ is a $C_1$-$C_{14}$ aliphatic hydrocarbyl, X is halogen, and a is an integer ranging from 1 to 4.

6. The catalyst component according to claim 1, wherein the internal electron donors are a combination of a first internal electron donor and a second internal electron donor, wherein the first internal electron donor is at least one ester of diol, and the second internal electron donor is at least one diether compound, and wherein a molar ratio of the first internal electron donor to the second internal electron donor is in a range of from 0.55:1 to 50:1.

7. The catalyst component according to claim 6, wherein the ester of diol is chosen from those represent by formula (3):

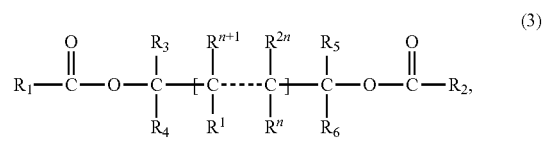

wherein, $R_1$ and $R_2$ are identical or different, and are independently $C_1$-$C_{10}$ linear or branched alkyl, $C_3$-$C_{20}$ cycloalkyl, $C_6$-$C_{20}$ aryl, $C_7$-$C_{20}$ alkylaryl or $C_7$-$C_{20}$ arylalkyl, with the hydrogen atom(s) on the phenyl ring in the aryl, the alkylaryl and the arylalkyl being optionally substituted by halogen atom(s); $R_3$-$R_6$ and $R^1$-$R^{2n}$ are identical or different, and are independently hydrogen, halogen, $C_1$-$C_{20}$ linear or branched alkyl, $C_3$-$C_{20}$ cycloalkyl, $C_6$-$C_{20}$ aryl, $C_7$-$C_{20}$ alkylaryl, $C_7$-$C_{20}$ arylalkyl, $C_2$-$C_{10}$ alkenyl or $C_{10}$-$C_{20}$ fused-ring aryl, with carbon atom(s) and/or hydrogen atom(s) in $R_3$-$R_6$ and $R^1$-$R^{2n}$ being optionally replaced by heteroatom(s), which is/are chosen from nitrogen, oxygen, sulfur, silicon, phosphorus and halogen, and two or more of $R_3$ to $R_6$ and $R^1$ to $R^{2n}$ are optionally linked to form a saturated or unsaturated ring; and n is an integer ranging from 0 to 10.

8. The catalyst component according to claim 6, wherein the diether compound is chosen from those represented by formula (5):

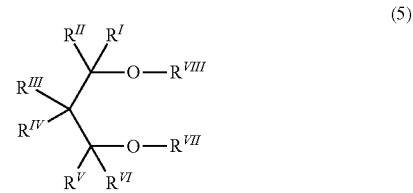

wherein, $R^I$, $R^{II}$, $R^{III}$, $R^{IV}$, $R^V$ and $R^{VI}$ are identical or different, and are independently chosen from hydrogen, halogen, linear or branched $C_1$-$C_{20}$ alkyl, $C_3$-$C_{20}$ cycloalkyl, $C_6$-$C_{20}$ aryl, $C_7$-$C_{20}$ arylalkyl and $C_7$-$C_{20}$ alkylaryl; $R^{VII}$ and $R^{VIII}$ are identical or different, and are independently chosen from linear or branched $C_1$-$C_{20}$ alkyl, $C_3$-$C_{20}$ cycloalkyl, $C_6$-$C_{20}$ aryl, $C_7$-$C_{20}$ alkylaryl and $C_7$-$C_{20}$ arylalkyl; and two or more of the $R^I$-$R^{VI}$ groups are optionally linked to form a ring.

9. A method for preparing a catalyst component according to claim 1, which method comprises the steps of:
   (1) preparing a solid component by a process comprising:
      (a) reacting a magnesium halide of formula $MgX_2$ with an alcohol of formula $R_IOH$ in the presence of at least one polymeric dispersion stabilizer at 30 to 160° C. in a closed vessel, to form a magnesium halide-alcohol adduct solution; and (b) reacting the magnesium halide-alcohol adduct solution with an epoxide represented by formula (2):

at 30 to 160° C., to form a solid component,
wherein, X is halogen; $R_I$ is a $C_1$-$C_{12}$ linear or branched alkyl; $R_{II}$ and $R_{III}$ are identical or different, and are independently hydrogen or unsubstituted or halogen-substituted $C_1$-$C_5$ linear or branched alkyl, and
wherein, relative to one mole of the magnesium halide, the amount of the alcohol used ranges from 3 to 30 moles and the amount of the epoxide represented by the formula (2) used ranges from 1 to 10 moles, and the polymeric dispersion stabilizer is used in an amount of from 0.1 to 10 wt %, based on the total weight of the magnesium halide and the alcohol; and
(2) contacting and reacting the solid component from step (1) with a titanium compound in the presence or absence of an inert solvent, and adding at least two internal electron donors at one or more stages before, during and/or after the reaction.

10. The method according to claim 9, wherein, relative to one mole of the magnesium halide, the amount of the alcohol used ranges from 4 to 20 moles and the amount of the epoxide represented by the formula (2) used ranges from 2 to 6 moles, and the polymeric dispersion stabilizer is used in an amount of from 0.2 to 5 wt %, based on the total weight of the magnesium halide and the alcohol.

11. The method according to claim 9, wherein the magnesium halide is at least one chosen from magnesium dichloride, magnesium dibromide and magnesium diiodide, and the alcohol is at least one chosen from methanol, ethanol, propanol, isopropanol, n-butanol, isobutanol, pentanol, isopentanol, n-hexanol, n-octanol, and 2-ethylhexanol, and the epoxide is at least one chosen from epoxy ethane, epoxy propane, epoxy butane, epoxy chloropropane, epoxy chlorobutane, epoxy bromopropane, and epoxy bromobutane.

12. The method according to claim 9, wherein the polymeric dispersion stabilizer is at least one chosen from polyacrylates, styrene-maleic anhydride copolymers, polystyrene sulfonates, naphthalenesulfonic acid-formaldehyde condensation products, condensed alkyl phenyl ether sulfates, condensed alkylphenol poly oxyethylene ether phosphates, oxyalkyl acrylate copolymer-modified poly ethyleneimines, poly(l-dodecyl-4-vinylpyridinium bromide)s, poly(vinylbenzyl trimethyl ammonium salt)s, poly(vinyl alcohol)s, polyacrylamides, ethylene oxide-propylene oxide block copolymers, polyvinylpyrrolidones (PVPs), poly(vinylpyrrolidone-co-vinyl acetate)s, poly(ethylene glycol)s (PEGs), alkylphenyl polyoxyethylene ethers and poly(alkyl methylacrylate)s, preferably at least one of polyvinylpyrrolidone, poly(vinylpyrrolidone-co-vinyl acetate)s and poly (ethylene glycol)s, and the weight average molecular weight of the polymeric dispersion stabilizer is larger than 1000.

13. The method according to claim 9, wherein the steps (a) and (b) are optionally carried out in the presence of an inert dispersion medium, and the inert dispersion medium is at least one chosen from liquid aliphatic, aromatic or alicyclic hydrocarbons and silicone oils.

14. The method according to claim 9, wherein no inert dispersion medium is used in both steps (a) and (b).

15. The method according to claim 9, wherein step (2) is performed as follows: the solid component is suspended in a titanium compound feed at −30° C. to 0° C., and then the suspension is heated to a temperature of 40 to 130° C. and allowed to react for 0.1 to 5 hours, wherein the titanium compound feed is the pure titanium compound or a mixture of the titanium compound and an inert solvent.

16. The catalyst component of claim 1, prepared by a method which comprises the steps of:
(1) preparing a solid component by a process comprising:
(a) reacting a magnesium halide of formula $MgX_2$ with an alcohol of formula $R_IOH$ in the presence of at least one polymeric dispersion stabilizer at 30 to 160° C. in a closed vessel, to form a magnesium halide-alcohol adduct solution; and
(b) reacting the magnesium halide-alcohol adduct solution with an epoxide represented by formula (2):

at 30 to 160° C., to form a solid component,
wherein, X is halogen; $R_I$ is a $C_1$-$C_{12}$ linear or branched alkyl; $R_{II}$ and $R_{III}$ are identical or different, and are independently hydrogen or unsubstituted or halogen-substituted $C_1$-$C_5$ linear or branched alkyl, and
wherein, relative to one mole of the magnesium halide, the amount of the alcohol used ranges from 3 to 30 moles and the amount of the epoxide represented by the formula (2) used ranges from 1 to 10 moles, and the polymeric dispersion stabilizer is used in an amount of from 0.1 to 10 wt %, based on the total weight of the magnesium halide and the alcohol; and
(2) contacting and reacting the solid component from step (1) with a titanium compound in the presence or absence of an inert solvent, and adding at least two internal electron donors at one or more stages before, during and/or after the reaction.

17. A catalyst for olefin polymerization, comprising:
(i) a catalyst component for olefin polymerization of according to claim 1;
(ii) at least one alkyl aluminum compound; and
(iii) optionally, at least one external electron donor.

18. A method for polymerization of an olefin monomer, comprising providing an olefin(s), and contacting the olefin with a catalyst according to claim 17 under polymerization conditions to cause the olefin to polymerize so as to form an olefin polymer.

19. The method of claim 18, further comprising recovering the resultant olefin polymer,
wherein contacting comprises contacting the olefin that comprises an olefin of formula $CH_2$=CHR wherein R is hydrogen, $C_1$-$C_6$ alkyl or $C_6$-$C_{12}$ aryl, and optionally a comonomer with the catalyst of claim 17 under polymerization conditions, to form the olefin polymer.

20. The catalyst component according to claim 4, wherein the internal electron donors are a combination of a first internal electron donor and a second internal electron donor, wherein the first internal electron donor is at least one ester of diol, and the second internal electron donor is at least one diether compound, and wherein a molar ratio of the first internal electron donor to the second internal electron donor is in a range of from 0.55:1 to 50:1.

21. The catalyst component according to claim 6, wherein the ester of diol is chosen from those represented by formula (4):

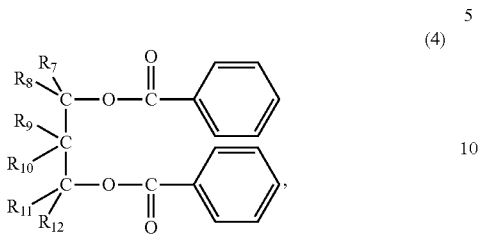

(4)

wherein $R_7$-$R_{12}$ are identical or different, and are independently chosen from hydrogen and $C_1$-$C_{20}$ linear or branched alkyl, and wherein the diether compound is chosen from those represented by general formula: $R^1R^2C(CH_2OR^3)(CH_2OR^4)$, wherein $R^1$ and $R^2$ are identical or different, and are independently chosen from linear or branched $C_1$-$C_{18}$ alkyl, $C_3$-$C_{18}$ cycloalkyl, $C_6$-$C_{18}$ aryl and $C_7$-$C_{18}$ arylalkyl, and are optionally linked to form a ring; and $R^3$ and $R^4$ are identical or different, and are independently linear or branched $C_1$-$C_{10}$ alkyl.

* * * * *